United States Patent
Oreshkin et al.

(10) Patent No.: US 11,922,294 B2
(45) Date of Patent: Mar. 5, 2024

(54) NEURAL NETWORK EXECUTION BLOCK USING FULLY CONNECTED LAYERS

(71) Applicant: ELEMENT AI INC., Montreal (CA)

(72) Inventors: Boris Oreshkin, Montreal (CA); Dmitri Carpov, Montreal (CA)

(73) Assignee: ServiceNow Canada Inc., Montreal (CA)

(*) Notice: Subject to any disclaimer, the term of this patent is extended or adjusted under 35 U.S.C. 154(b) by 385 days.

(21) Appl. No.: 16/854,564

(22) Filed: Apr. 21, 2020

(65) Prior Publication Data

US 2020/0372329 A1 Nov. 26, 2020

Related U.S. Application Data

(60) Provisional application No. 62/851,334, filed on May 22, 2019.

(51) Int. Cl.
| | |
|---|---|
| *G06N 3/06* | (2006.01) |
| *G06F 1/03* | (2006.01) |
| *G06F 17/18* | (2006.01) |
| *G06N 3/045* | (2023.01) |
| *G06N 3/063* | (2023.01) |
| *G06Q 10/04* | (2023.01) |

(52) U.S. Cl.
CPC ........... *G06N 3/063* (2013.01); *G06F 1/0321* (2013.01); *G06F 17/18* (2013.01); *G06N 3/045* (2023.01); *G06Q 10/04* (2013.01)

(58) Field of Classification Search
CPC .... G06N 3/063; G06N 3/0454; G06F 1/0321; G06F 17/18; G06Q 10/04
See application file for complete search history.

(56) References Cited

U.S. PATENT DOCUMENTS

| | | | | |
|---|---|---|---|---|
| 10,431,210 | B1* | 10/2019 | Huang | .................. G06F 40/216 |
| 10,446,147 | B1* | 10/2019 | Moniz | ..................... G06F 3/167 |
| 2006/0010089 | A1 | 1/2006 | Goodnight et al. | |
| 2007/0185825 | A1* | 8/2007 | Ito | ........................ G06N 3/0445 |
| | | | | 706/30 |

(Continued)

OTHER PUBLICATIONS

Holt, C.C. "Forecasting seasonals and trends by exponentially weighted moving averages" International Journal of Forecasting 20, 2004, Elsevier. 6 Pages.

(Continued)

*Primary Examiner* — Scott C Anderson
(74) *Attorney, Agent, or Firm* — Gowling WLG (Canada) LLP (57) ABSTRACT

Systems and components for use with neural networks. An execution block and a system architecture using that execution block are disclosed. The execution block uses a fully connected stack of layers and one output is a forecast for a time series while another output is a backcast that can be used to determine a residual from the input to the execution block. The execution block uses a waveform generator sub-unit whose parameters can be judiciously selected to thereby constrain the possible set of waveforms generated. By doing so, the execution block specializes its function. The system using the execution block has been shown to be better than the state of the art in providing solutions to the time series problem.

18 Claims, 3 Drawing Sheets

(56) References Cited

U.S. PATENT DOCUMENTS

| | | | |
|---|---|---|---|
| 2018/0026550 A1* | 1/2018 | Dent | H02J 7/0068 |
| | | | 363/55 |
| 2019/0066713 A1* | 2/2019 | Mesgarani | G10L 17/26 |
| 2020/0184055 A1* | 6/2020 | Storm | G06F 21/604 |

OTHER PUBLICATIONS

Winters, P.R. "Forecasting Sales By Exponentially Weighted Moving Averages" Apr. 1960, vol. 6. No. 3, Management Science. 20 Pages.

Assimakopoulos V. et al. "The theta model: a decomposition approach to forecasting" International Journal of Forecasting 16, 2000, Elsevier. 10 Pages.

Hyndman, R.J., et al. "Automatic Time Series Forecasting: The forecast Package for R" Journal of Statistical Software, Jul. 2008, vol. 27, Issue 3., American Statistical Association. 22 Pages.

Chen, T., et al. "XGBoost: A Scalable Tree Boosting System" Aug. 13-17, 2016. 2016 ACM. 10 Pages.

Rangapuram, S.S., et al. "Deep State Space Models for Time Series Forecasting" 2018, 32nd Conference on Neural Information Processing Systems. NeurIPS. 10 Pages.

Toubeau, J., et al. "Deep Learning-Based Multivariate Probabilistic Forecasting for Short-Term Scheduling in Power Markets" Mar. 2019, vol. 34, No. 2, IEEE Transactions On Power Systems, 2018 IEEE. 13 Pages.

Zia, T., et al. "Residual Recurrent Highway Networks for Learning Deep Sequence Prediction Models" Jun. 6, 2018. Springer Science+Business Media B.V. Springer. 8 Pages.

Chang, S., et al. "Dilated Recurrent Neural Networks" 2017, 31st Conference on Neural Information Processing Systems, NIPS 2017. 11 Pages.

Kim, J., et al."Residual LSTM: Design of a Deep Recurrent Architecture for Distant Speech Recognition" Aug. 20-24, 2017. Interspeech 2017. 2017 ISCA. 5 Pages.

Qin, Y., et al."A Dual-Stage Attention-Based Recurrent Neural Network for Time Series Prediction" 2017, International Joint Conference on Artificial Intelligence (IJCAI). 7 Pages.

Extended European Search Report dated Apr. 12, 2023 for corresponding EP application No. 20810572.6.

Couraud, B. et al., "A distribution loads forecast methodology based on transmission grid substations SCADA Data", 2014 IEEE Innovative Smart Grid Technologies—Asia (ISGT Asia), May 20, 2014, pp. 35-40.

Levin, A. U. et al., "Fast Pruning Using Principal Components", Department of Computer Science and Engineering, Jan. 1, 1993, pp. 35-42.

* cited by examiner

NEURAL NETWORK EXECUTION BLOCK USING FULLY CONNECTED LAYERS

RELATED APPLICATION

This application is a US non provisional patent application which claims the benefit of U.S. provisional application No. 62/851,334 filed on May 22, 2019.

TECHNICAL FIELD

The present invention relates to computer technology and machine learning. More specifically, the present invention relates to a neural network-based building block architecture and a system using that building block that is suitable for solutions relating to time series problems.

BACKGROUND

The application of deep learning has recently seen significant success due to either the invention of or the adoption of architectures that successfully encode domain specific inductive bias about the nature of the problem. Examples include the invention of the convolution neural network (CNN) stack in the image processing domain, the invention and use of recurrent neural networks (RNNs), attention mechanisms and their combinations with CNNs in language modeling, as well as the invention of prototypical networks in few-shot learning.

In contrast, a significant portion of the current work in the machine learning literature that relates to time series forecasting is focused on applying off-the-shelf deep learning components (mostly flavors of RNN, CNN and combinations thereof) to a time series forecasting task. This is often done without a focus on encoding the time series specific domain knowledge in the neural architecture.

Based on the above, there is a need for a novel architecture that is not an off-the-shelf solution and that introduces new concepts into the field. As well, it is preferable that the new architecture and systems outperform the well-known systems and methods currently used for solving time series problems.

SUMMARY

The present invention provides systems and components for use with neural networks. An execution block and a system architecture using that execution block are disclosed. The execution block uses a fully connected stack of layers and one output is a forecast for a time series while another output is a backcast that can be used to determine a residual from the input to the execution block. The execution block uses a waveform generator sub-unit whose parameters can be judiciously selected to thereby constrain the possible set of waveforms generated. By doing so, the execution block specializes its function. The system using the execution block has been shown to be better than the state of the art in providing solutions to the time series problem.

In a first aspect, the present invention provides an execution block for use with a neural network system, the execution block comprising:
 a stack of fully connected layers of neural network nodes, said stack having an output being received in parallel by a first parallel branch and a second parallel branch;
 said first parallel branch comprising:
  a first fully connected layer of neural network nodes receiving said output and a first waveform generator sub-unit receiving an output of said first fully connected layer;
 said second parallel branch comprising:
  a second fully connected layer of neural network nodes receiving said output and a second waveform generator sub-unit receiving an output of said second fully connected layer;
 wherein
 an output of said first parallel branch is a synthesis of basis functions of said execution block;
 an output of said second parallel branch is used to form a residual of an input to said execution block.

In a second aspect, the present invention provides a neural network system for use in time series forecasting, the system comprising:
 a plurality of basis stacks, said basis stacks being coupled in sequence with each basis stack comprising at least one execution block, an output of each basis stack being added to a cumulative output for said neural network system;
 wherein
 at least one execution block comprises:
  a stack of fully connected layers of neural network nodes, said stack having an output being received in parallel by a first parallel branch and a second parallel branch;
  said first parallel branch comprising:
   a first fully connected layer of neural network nodes receiving said output and a first waveform generator sub-unit receiving an output of said first fully connected layer;
  said second parallel branch comprising:
   a second fully connected layer of neural network nodes receiving said output and a second waveform generator sub-unit receiving an output of said second fully connected layer;
  and wherein
  an output of said first parallel branch is a synthesis of basis functions of said execution block;
  an output of said second parallel branch is used to form a residual of an input to said execution block.

BRIEF DESCRIPTION OF THE DRAWINGS

The embodiments of the present invention will now be described by reference to the following figures, in which identical reference numerals in different figures indicate identical elements and in which.

DETAILED DESCRIPTION

For greater clarity and for the convenience of the reader, full citations for the references noted in the following discussion can be found in the listing at the end of this section. The entirety of the contents of these references is therefore incorporated herein by reference.

To provide context to the present invention, the present document considers the univariate point forecast problem. Given the length of forecast horizon, H, the task is to predict (or forecast) the vector $y \in R^H$, $y=[y_1, y_2, \ldots, y_H]$ of future values given a history $x \in R^{dim(x)}$. We denote $\hat{y}$ as the forecast of y. The present document uses the metrics below:

$$sMAPE = \frac{1}{H}\sum_{i=1}^{H}\frac{2|y_i - \hat{y}_i|}{|y_i| + |\hat{y}_i|}$$

$$MASE = \frac{1}{H}\sum_{i=1}^{H}\frac{2|y_i - \hat{y}_i|}{\frac{1}{n-m}\sum_{j=m+1}^{n}|y_j - \hat{y}_j - m|}$$

$$OWA = 0.5 \ [sMAPE/13.564 + MASE/1.912]$$

It should be noted that sMAPE (symmetric Mean Absolute Percentage Error) and MASE (Mean Absolute Scaled Error) are standard metrics widely used across the forecasting industry. OWA (Overall Weighted Average) is a metric based on the two other metrics above.

Figure 1:
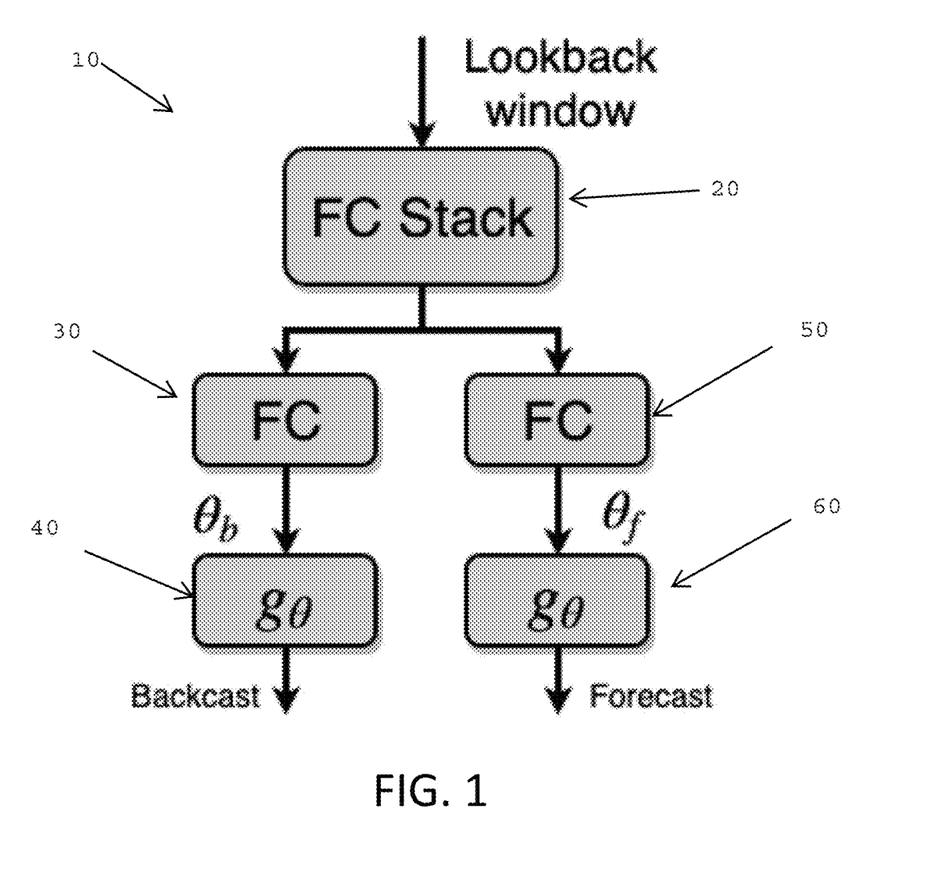
FIG. 1 is a schematic block diagram of an execution block according to one aspect of the present invention.

The present invention, in one aspect, provides a basic execution block that may be used in an architecture that is useful for solving the above noted time series/forecast problem. The basic building block or execution block is depicted in FIG. 1. The block accepts the input signal x and outputs two signals, $\hat{x}$ and $\hat{y}$. The input x is a history lookback window of certain length, $\hat{y}$ is the block's forward forecast of length H and $\hat{x}$ is the block's best estimate of x given the constraints on the functional space that the block can use to approximate signals. The length of the input window is a function of the length of forecast horizon, H, and typical lengths of x in our setup are 2H, 3H, . . . , 7H.

Internally, the basic building block consists of two distinct parts. First, the waveform generator $g_\theta$: $T^H \rightarrow Y^H$ is a map from the set of points in the time domain $T^H \subset R^H$ to the set of points in the forecast value domain, $Y^H \subset R$. The waveform generator is parameterized with a set of parameters $\theta \in \Theta$. Second, the forward and the backward predictors of parameters of the waveform generator, $\varphi_\phi^f: R^{dim(x)} \rightarrow \Theta$ and $\varphi_\phi^b: R^{dim(x)} \rightarrow \Theta$. The function of go is twofold: (i) providing a sufficiently rich set of time varying waveforms, selectable by varying $\theta$, and (ii) encoding the inductive bias specific to time-series forecasting domain in order to regularize and appropriately constrain the structure of viable solutions. The functions of $\varphi_\phi^f$ and $\varphi_\phi^b$ are related but are not exactly the same. Both of these predict parameters of $g_\theta$ and thus attempt to select the best waveform out of all available in the space spanned by $g_\theta$.

The basic building block is a stack of fully connected layers that predicts basis expansion coefficients both forward, $\theta$, (forecast) and backward, $\theta_b$, (backcast) based on the input time series window.

As can be seen in FIG. 1, the execution block 10 has a fully connected stack 20 of multiple neural network layers. This stack 20 has an output that is received by two parallel branches. The first branch has a fully connected layer 30 and the output of this layer 30 is received by a waveform generator sub-unit 40. The second branch also has a fully connected layer 50 and a similar waveform generator sub-unit 60. The output of the first branch is used for determining a residual of the execution block's input while the output of the second branch is used for a forecast.

Figure 2:
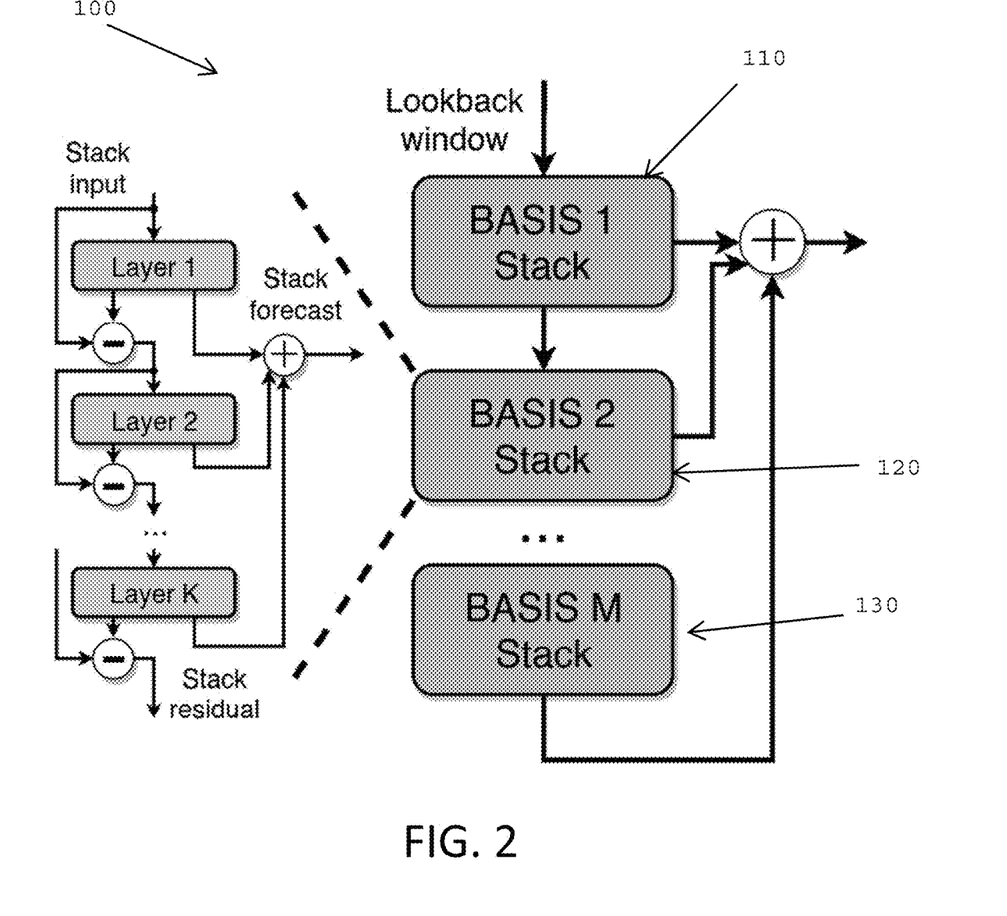
FIG. 2 is a schematic block diagram of a neural net system architecture according to another aspect of the present invention.

Referring to FIG. 2, a block diagram of a system architecture that uses the execution block in FIG. 1 is illustrated. The basic building blocks (layers) of the architecture are used to form a stack of layers corresponding to the same output basis functions. The weights of fully connected layers are shared within the basis stack. The stacks are further chained in a deep neural network.

Referring to FIG. 2, the system 100 has a number of basis stacks 110, 120, 130, each of which produces a forecast. Each of these forecast outputs is added to produce a system output. Within each basis stack are a number of layers, each of which is an instance of the execution block illustrated in FIG. 1. As can be seen, the forecast output of each layer/execution block is added to a stack forecast output. Each backcast output of each layer/execution block is used to determine the residual of the input to the layer/execution block and this residual is used as input to the immediately succeeding layer/execution block.

The architecture depicted in FIG. 2 has two residual branches, one running over backcast prediction branch of each block and the other is running over the forecast branch of each block. The backcast residual branch has the interpretation of running sequential analysis of the signal and the gradient backpropagated through the backcast residual branch drives the parameters of each block (FIG. 1) to facilitate the tasks performed by the blocks subsequent to it. The forecast residual branch is aggregated into the total forecast first at the level of the stack and then over stacks (hierarchical aspect). Each stack has the same $g\theta$ for each layer. The interpretation of the hierarchical forecast aggregation is then two-fold: (i) each layer down the stream is providing a more refined forecast and (ii) and more important, the forecasts aggregated at the stack level model an aspect of the forecast encoded in the nature of $g\theta$.

As can be seen, the basic building block depicted in FIG. 1 produces two outputs: the lookback window approximation in the block's basis (backcast) and a forecast based on the synthesis of its basis functions. The backcast output of each basic block is used to form the residual of the basic block's input with the block's approximation of the input in its basis. From FIG. 2, the forecast output is added to the output of the basis stack. The residual of the preceding layer is used as input of the next layer. The basic layers are stacked into a deep neural network.

To implement a trend model for the execution block described above, it must be noted that a typical characteristic of trend is that most of the time it is a monotonic function, or at least a slowly varying function. Therefore, to model this type of function it is sufficient to limit the expressive range of $g_\theta$ to functions that vary slowly across forecast window. In order to mimic this behaviour $g_\theta$ is constrained to be a polynomial of small degree p:

$$g_\theta(t) = \sum_{i=0}^{p} \theta_i t^i.$$

The trend forecast will then have the form $$\hat{y}_{i,j}^{tr} = T\theta_{i,j},$$

where $\theta_{i,j}$ are polynomial coefficients predicted by a fully connected network of layer j of stack i and $T=[1, t, \ldots, t^p]$ is a fixed matrix containing powers of time vector $t=[0, 1, 2, \ldots, H-2, H-1]^T$ running from 0 (next sample forecast) to H-1, forecasting H steps ahead. If p set to be low, for example 2 or 3, it will constrain $\hat{y}_{i,j}^{tr}$ to mimic trend.

To also implement a seasonality model using the above architecture, it should be noted that a typical characteristic of seasonality is that it is a regular, cyclical, recurring fluctuation. Therefore, to model seasonality, $g_\theta$ is constrained to belong to the class of periodic functions $g_\theta(t) = g_\theta(t-s)$, where s is a seasonality period. A natural choice for the basis to model periodic function is the Fourier series:

$$g_\theta(t) = \sum_{i=0}^{\lfloor H/2 \rfloor} \theta_i \cos(2\pi i t) + \theta_{i+r}\sin(2\pi i t),$$

The seasonality forecast will then have the form $$\hat{y}_{i,j}^s = S\theta_{i,j},$$

where, as before, $\theta_{i,j}$ are Fourier coefficients predicted by a fully connected network of layer j of stack i and $S=[1, \cos(2\pi t), \ldots \cos(2\pi[H/2]t)), \sin(2\pi t), \ldots, \sin(2\pi[H2]t))]$ is a fixed matrix of sinusoidal waveforms. The seasonality forecast $\hat{y}_{i,j}^s$ is, by design, a periodic function best suited to mimic typical seasonal pattern.

An interpretable architecture may also be implemented for one version of the present invention. It can be constructed by reusing the overall architectural approach depicted in the Figures and by adding additional structure to $g_\theta$ for each stack. TS (time series) forecasting practitioners often use the decomposition of TS into trend and seasonality, such as those performed by STL ("Seasonal and Trend Decomposition using Loess" method for decomposing time series developed in 1990) and X13-ARIMA (X-13 ARIMA is the US Census Bureau's software package for seasonal adjustment) procedures. For one implementation of the present invention, the trend and seasonality decomposition are designed into the model to make the stack outputs more easily interpretable.

In one implementation, the overall interpretable architecture consists of two stacks: the trend modeling stack is followed by the seasonality modeling stack. The doubly residual stacking combined with the forecast/backcast principle result in (i) the trend component being removed from the input window x before it is fed into the seasonality analysis stack and (ii) the partial forecasts of trend and seasonality are available as separate interpretable outputs. Structurally, each of the stacks consists of several blocks connected with residual connections as depicted in FIG. 1 and each of them shares its respective, non-learnable $g_\theta$. The number of blocks is three for both trend and seasonality. It was found that on top of sharing $g_\theta$, sharing all the weights across blocks in a stack resulted in better performance on validation set.

Figure 3:
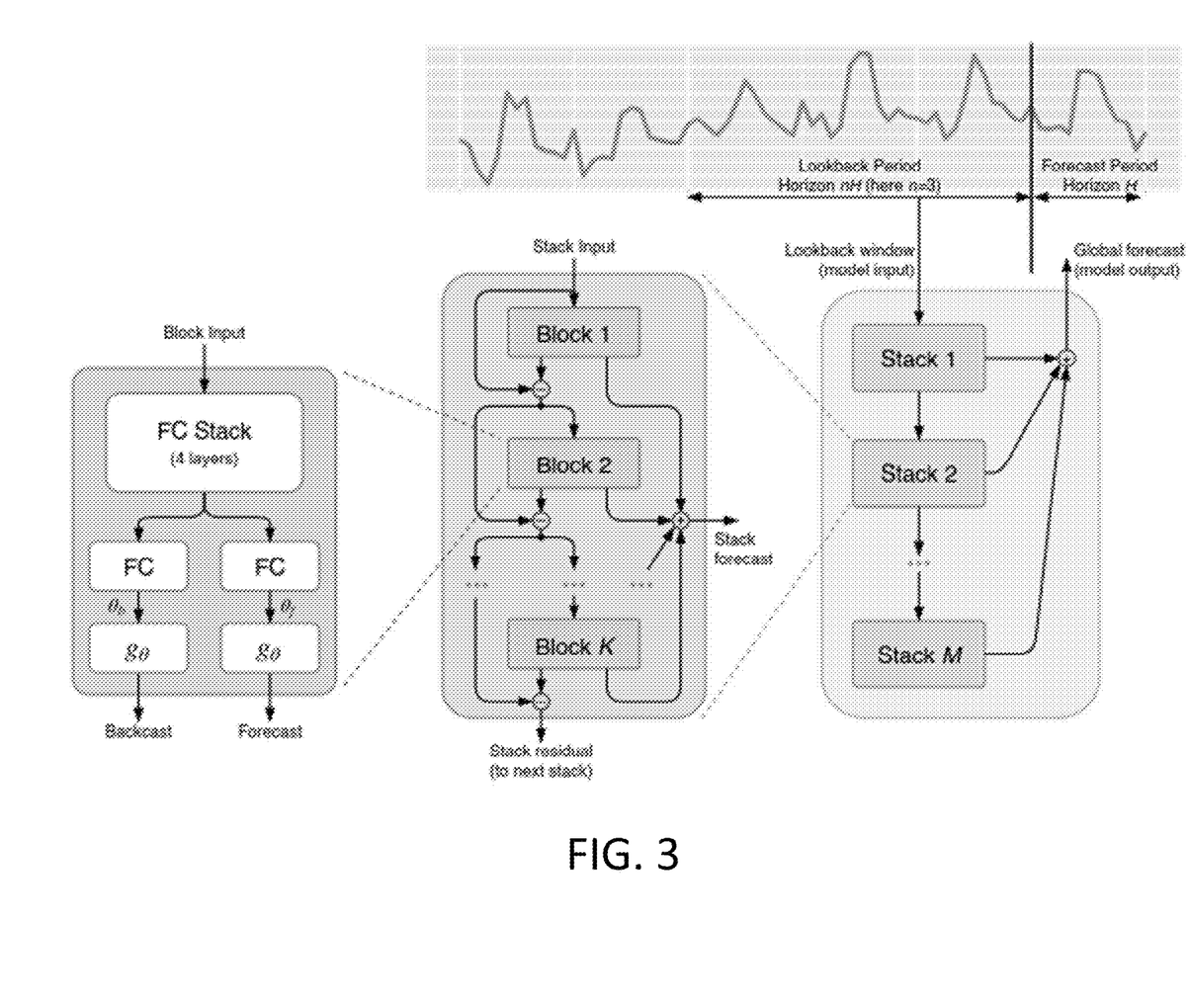
FIG. 3 is a schematic block diagram of one implementation of the present invention and illustrating how the various aspects can work together to form a whole system.

One overall system view of one implementation of the present invention can be seen in FIG. 3. In this implementation, the basic building block is a multi-layer FC network with ReLU nonlinearities. It predicts basis expansion coefficients both forward, $\theta_f$ (forecast) and backward, $\theta_b$, (backcast). Blocks are organized into stacks using the doubly residual stacking principle. A stack may have layers with shared $g_\theta$. Forecasts are aggregated in hierarchical fashion. This enables the building of a very deep neural network with interpretable outputs.

Regarding implementation and testing of the present invention, the test subset is derived from a large and diverse 100k-series dataset consisting of data frequently encountered in business, financial, and economic forecasting, and sampling frequencies ranging from hourly to yearly. In one implementation, the source dataset consists of time series of Yearly, Quarterly, Monthly, and Other (Weekly, Daily, and Hourly) data with the dataset's minimum number of observations being 13 for Yearly, 16 for Quarterly, 42 for Monthly, 80 for Weekly, 93 for Daily, and 700 for Hourly series. The time series of the dataset come mainly from the Economic, Finance, Demographics and Industry areas, while also including data from Tourism, Trade, Labor and Wage, Real Estate, Transportation, Natural Resources and the Environment. The validation and train subsets are obtained by splitting the full train set at the boundary of last horizon of each time series. The train and validation subsets are used to tune hyperparameters and report the results of ablation studies. Once the hyperparameters are determined, the model is trained on the full train set and report results on the test set.

Tensorflow was used to implement the architecture and perform training of the neural architecture. Parameters of the network are shared across horizons, therefore there are a total of 6 models, one per horizon. If every time series is interpreted as a separate task, this can be linked back to the multitask learning, in which a neural network is regularized by learning on multiple tasks to improve generalization. It should be stressed that that models for different horizons reuse the same architecture and all of the hyperparameters are fixed to the same values across horizons, except for a minor exception explained below. Since architecture and even hyperparameters across horizons can be reused indicates that the architecture design of the present invention generalizes well across time series of different natures. The same architecture is successfully trained on a horizon with 48k time series (Monthly) and 359 time series (Weekly). This is a much stronger result than, for example, the result achieved by those who had to use very different architectures hand crafted for different horizons.

To update network parameters, train batches of fixed size 1024 are sampled, each sample consisting of TS from the same horizon. Hence only the neural network corresponding to this horizon is updated. The batch is assembled by first sampling a horizon with the probability equal to the percentage of the TS of this horizon in the dataset (for example Yearly, horizon 6, consisting of 23k TS is sampled with the probability 0.23). Given the horizon, 1024 TS ids from this horizon are selected, uniformly at random with replacement. For each selected TS id, a random forecast point from the historical range of length $L_H H$ immediately preceding the last point in the train part of the TS is selected. $L_H$ is a hyperparameter equal to 1.5 for horizons with massive numbers of time series (Yearly, Monthly, Quarterly) and 15 for horizons with small and modest numbers of time series included in Others (Weekly, Daily, Hourly). Given a sampled forecast point, one horizon worth of points following it is set to be the target forecast window y and the history of points of one of lengths 2H, 3H, ..., 7H preceding it is set to be the input x to the network. An Adam optimizer is used with default settings and initial learning rate 0.001. The neural network training is run for 30k batches. The GPU based training of one ensemble member takes between 30 min and 2 hours depending on the neural network settings and hardware.

To test the present invention against known architectures, it should be clear that ensembling is used by the known architectures the present invention is tested against. In order to be comparable to these architectures, ensembling was also used with the present invention. It was chosen to build an ensemble using several ways of diversifying the individual models. First, the ensemble models are fit on three different metrics: sMAPE, MASE and a non-symmetric version of sMAPE that has only the ground truth value in the denominator. The second diversification method is based on including the models trained on input windows of different length. For every horizon H, ensemble consists of individual models trained on the input window x of length 2H, 3H, . . . , 7H, 6 window length option total. Thus, the overall ensemble has a multi-scale aspect to it. Finally, a standard bagging procedure was performed by sampling a subset of time series and a subset of x entries to train each ensemble member. Each individual model is trained on 20% of time series belonging to its horizon and is using 75% of entries in x. 180 models in ensemble were used and ensemble settings are cross validated on a validation set.

The performance of two configurations of the present invention was studied: the generic one (Ours-G), the interpretable one (Ours-I) as well as their ensemble (Our-I+G). These were compared against four different architectures: each of them being in a different model class. The four architectures are pure ML, pure statistical, ML/TS combination, and DL/TS hybrid. In the table given below, Best pure ML is the pure ML architecture, Best statistical is the pure statistical model, Best ML/TS is the machine learning/time series architecture (based on a combination of time series specific features provided by a few statistical time series models and a machine learning layer on top of these), and DL/TS is a deep learning/time series architecture (based on the fusion of CNN/LSTM stack with a Holt-Winters time series engine with learnable parameters).

The results of the tests are shown in Tables 1 and 2. From these tables, it can be clearly seen that the present invention outperforms all other approaches on all subsets of time series and the OWA gap between our generic model and the DL/TS hybrid (0.821−0.799=0.022) is greater than the gap between the DL/TS hybrid and the second best architecture (0.838−0.821=0.017). Our generic model was specifically designed to be pure. It uses no feature engineering, no scaling and no internal architectural components that may be considered specific to the time series forecasting problem.

TABLE 1

|  | Yearly (23k) | Quarterly (24k) | Monthly (48k) | Others (5k) | Average (100k) |
|---|---|---|---|---|---|
| Best pure ML | 14.397 | 11.031 | 13.973 | 4.566 | 12.894 |
| Best statistical | 13.366 | 10.155 | 13.002 | 4.682 | 11.986 |
| Best ML/TS combination | 13.528 | 9.733 | 12.639 | 4.118 | 11.720 |
| DL/TS hybrid, M4 winner | 13.176 | 9.679 | 12.126 | 4.014 | 11.374 |
| Ours-G | 12.855 | 9.378 | 12.130 | 3.979 | 11.229 |
| Ours-I | 12.823 | 9.418 | 12.048 | 4.199 | 11.203 |
| Ours-I + G | 12.812 | 9.372 | 12.064 | 4.063 | 11.190 |

TABLE 2

|  | Yearly (23k) | Quarterly (24) | Monthly (48k) | Others (5k) | Average (100k) | Rank |
|---|---|---|---|---|---|---|
| Best pure ML | 0.859 | 0.939 | 0.941 | 0.991 | 0.915 | 23 |
| Best statistical | 0.788 | 0.898 | 0.905 | 0.989 | 0.861 | 8 |
| Best ML/TS combination | 0.799 | 0.847 | 0.858 | 0.914 | 0.838 | 2 |
| DL/TS hybrid, M4 winner | 0.778 | 0.847 | 0.836 | 0.920 | 0.821 | 1 |
| Ours-G | 0.755 | 0.814 | 0.821 | 0.876 | 0.799 |  |
| Ours-I | 0.753 | 0.819 | 0.820 | 0.911 | 0.799 |  |
| Ours-I + G | 0.752 | 0.814 | 0.819 | 0.889 | 0.797 |  |

It can thus be seen that the present invention performs extremely well on a wide array of time series forecasting tasks captured by the test dataset explained above. The present invention, essentially, forces each execution block into a specialization. Instead of having an execution block perform all the functions necessary for forecasting the succeeding entries in a time series, by constraining the range of wave functions used by the waveform generator, the execution block specializes into generating a smaller subset/group of waveforms. Thus, by judiciously constraining go, one can select each execution block's specialization.

Regarding implementation, the system of the present invention may be implemented on suitable hardware and software as understood by those of skill in the art. It should be clear that, in one implementation, the system may be implemented as a fully software system to be executed on suitable hardware systems. Thus, for such an implementation, each of the stacks in FIG. 3, as well as each of the blocks in FIG. 3, is a software construct in a hardware system's memory.

In another implementation, a hardware based implementation may use one or more processing modules for each of the blocks/layers in the architecture. For such an implementation, each layer illustrated in FIG. 2 (and each of the blocks in FIG. 3) can be implemented as one or more hardware processing modules. One potential issue with such an implementation is that adding more blocks or layers may require adding hardware processing modules to the system.

Yet a further implementation may minimize the hardware requirements for an implementation. For this implementation, a single processing module may be used as the blocks/layers in the architecture. For such an implementation, the data input into block 1 would be fed into the single processing module to produce the block 1 outputs. These block 1 outputs are then stored or accumulated as necessary. The relevant block 1 outputs (i.e. the residual outputs) are then fed back into the single processing module along with the inputs to block 2. The resulting block 2 results are then accumulated with the block 1 results are necessary and the relevant block 2 results (i.e. the block 2 residual results) are then fed back into the single processing module as block 3 inputs. The process can then be repeated as necessary until a final result is achieved or until a sufficient amount of blocks have executed their inputs.

Another implementation may be a hybrid of the last two implementations described above. For this implementation, instead of having a single processing module or an unending number of processing modules, a fixed number of processing modules would be used. These processing modules would then be used to process inputs as a cascading group. Thus, if there are 3 processing modules, then, in the first iteration, the three processing modules would be used to implement blocks 1, 2, and 3. The outputs of these 3 blocks would be accumulated as necessary and the residual output of block 3 would be fed back as input for block 4. Then, in the next iteration, the three processing blocks would be used to implement blocks 4, 5, and 6. The process would then repeat as necessary with the fixed number of processing blocks being used to implement the multiple blocks/layers.

It should be clear that although the above discussion uses the execution block and the system of the present invention are used for solutions to the time series problem, these aspects of the invention can be used in other contexts. The execution block and the system architecture using the execution block can be used in solving other problems and in other implementations that is suitable for neural networks or other machine learning systems/components.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A non-transitory computer readable medium having code stored thereon to provide an execution block for use with an artificial intelligence neural network system for time series forecasting, the execution block comprising:

a stack of fully connected layers of neural network nodes, said stack having input and output, said output being received in parallel by a first parallel branch and a second parallel branch;

said first parallel branch comprising:
a first fully connected layer of neural network nodes receiving and processing said output and a first waveform generator sub-unit receiving an output of said first fully connected layer;

said second parallel branch comprising:
a second fully connected layer of neural network nodes receiving and processing said output and a second waveform generator sub-unit receiving an output of said second fully connected layer;

wherein an output of said first parallel branch is a forecast of said execution block based on said input computed as a synthesis of basis functions of said execution block;

an output of said second parallel branch is an estimate of said execution block for said input and is used to form a residual of said input to said execution block;

different basis stacks are trained using different training data sets such that different basis stacks are suitable for different tasks; and said execution block is deployable for use with input windows of different lengths absent specific modification of the execution block for said input windows.

2. The non-transitory computer readable medium according to claim 1, wherein each of said first waveform generator sub-unit and second waveform generator sub-unit implements a function that maps a set of points in a time domain to a set of points in a forecast value domain.

3. The non-transitory computer readable medium according to claim 1, wherein said execution block is used to forecast a time series output.

4. The non-transitory computer readable medium according to claim 3, wherein an input to said execution block is an input signal detailing a history lookback window of values of a time series.

5. The non-transitory computer readable medium according to claim 2, wherein an output of each of said first waveform generator sub-unit and second waveform generator sub-unit is based on a set of parameters.

6. The non-transitory computer readable medium according to claim 3, wherein an output of each of said first waveform generator sub-unit and second waveform generator sub-unit encodes an inductive bias to regularize and constrain a structure of viable solutions for a time series problem.

7. The non-transitory computer readable medium according to claim 3, wherein an output of each of said first waveform generator sub-unit and second waveform generator sub-unit is based on a plurality of time varying waveforms.

8. The non-transitory computer readable medium according to claim 7 wherein said waveforms are selected based on a set of parameters selected for said first waveform generator sub-unit or second waveform generator sub-unit.

9. The non-transitory computer readable medium according to claim 2, wherein said execution block is used in a neural network system for time series forecasting.

10. The non-transitory computer readable medium according to claim 1 wherein the neural network system is used for providing a forecast related to one or more of the group of industries consisting of: economic, finance, demographics and industry, tourism, trade, labor and wage, real estate, transportation, and natural resources and environment.

11. A non-transitory computer readable medium having code stored thereon to provide an artificial intelligence neural network system for use in time series forecasting, the system comprising:

a plurality of basis stacks, said basis stacks being coupled in sequence with each basis stack comprising at least two execution blocks, an output of each basis stack being added to a cumulative output for said neural network system;

wherein each of said at least two execution blocks comprises:
a stack of fully connected layers of neural network nodes, said stack having input and output, said output being received in parallel by a first parallel branch and a second parallel branch;
said first parallel branch comprising:
a first fully connected layer of neural network nodes receiving and processing said output and a first waveform generator sub-unit receiving an output of said first fully connected layer;
said second parallel branch comprising:
a second fully connected layer of neural network nodes receiving and processing said output and a second waveform generator sub-unit receiving an output of said second fully connected layer;
and wherein
an output of said first parallel branch is a forecast of said execution block based on said input computed as a synthesis of basis functions of said execution block;
an output of said second parallel branch is an estimate of said execution block for said input and is used to form a residual of said execution block; and
each of said at least two execution blocks is forced into a specialization by constraining a range of wave functions generated by the corresponding first and second waveform generator sub-units;

different basis stacks are trained using different training data sets such that different basis stacks are suitable for different tasks; and said artificial intelligence neural network system is deployable for use with input windows of different lengths absent specific modification of the execution block for said input windows.

12. The non-transitory computer readable medium according to claim 11, wherein each of said first waveform generator sub-unit and second waveform generator sub-unit implements a function that maps a set of points in a time domain to a set of points in a forecast value domain.

13. The non-transitory computer readable medium according to claim 12, wherein an input to said neural network system is an input signal detailing a history look-back window of values of a time series.

14. The non-transitory computer readable medium according to claim 12, wherein an output of each of said first waveform generator sub-unit and second waveform generator sub-unit is based on a set of parameters.

15. The non-transitory computer readable medium according to claim 12, wherein an output of each of said first waveform generator sub-unit and second waveform generator sub-unit encodes an inductive bias to regularize and constrain a structure of viable solutions for a time series problem.

16. The non-transitory computer readable medium according to claim 12, wherein an output of each of said first waveform generator sub-unit and second waveform generator sub-unit is based on a plurality of time varying waveforms.

17. The non-transitory computer readable medium according to claim 16, wherein said waveforms are selected based on a set of parameters selected for said first waveform generator sub-unit or second waveform generator sub-unit.

18. The non-transitory computer readable medium according to claim 11 wherein the neural network system is used for providing a forecast related to one or more of the group of industries consisting of: economic, finance, demographics and industry, tourism, trade, labor and wage, real estate, transportation, and natural resources and environment.

* * * * *